(No Model.) 5 Sheets—Sheet 1.
H. BOWER.
UTILIZATION OF NATURAL GAS.
No. 338,028. Patented Mar. 16, 1886.
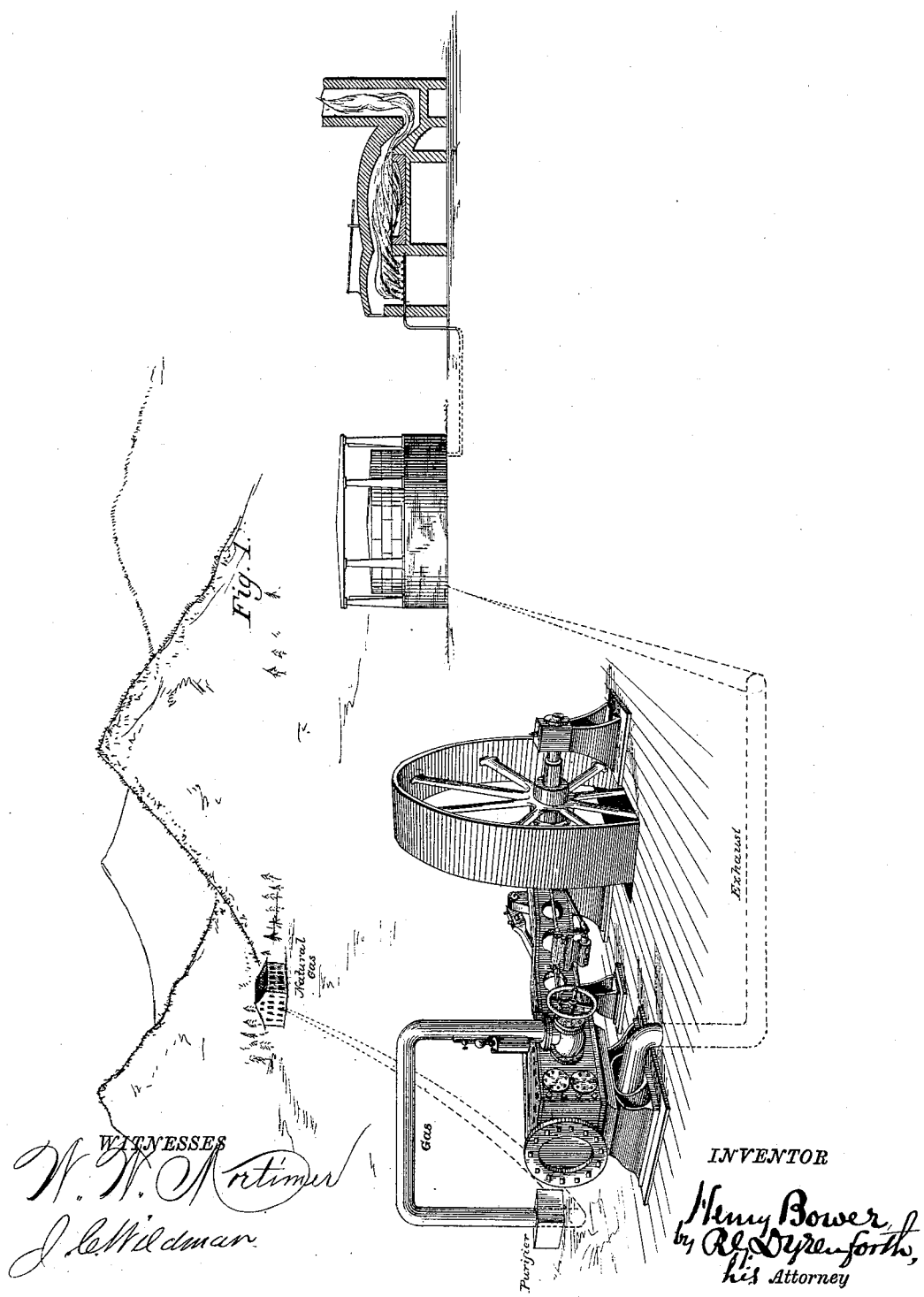

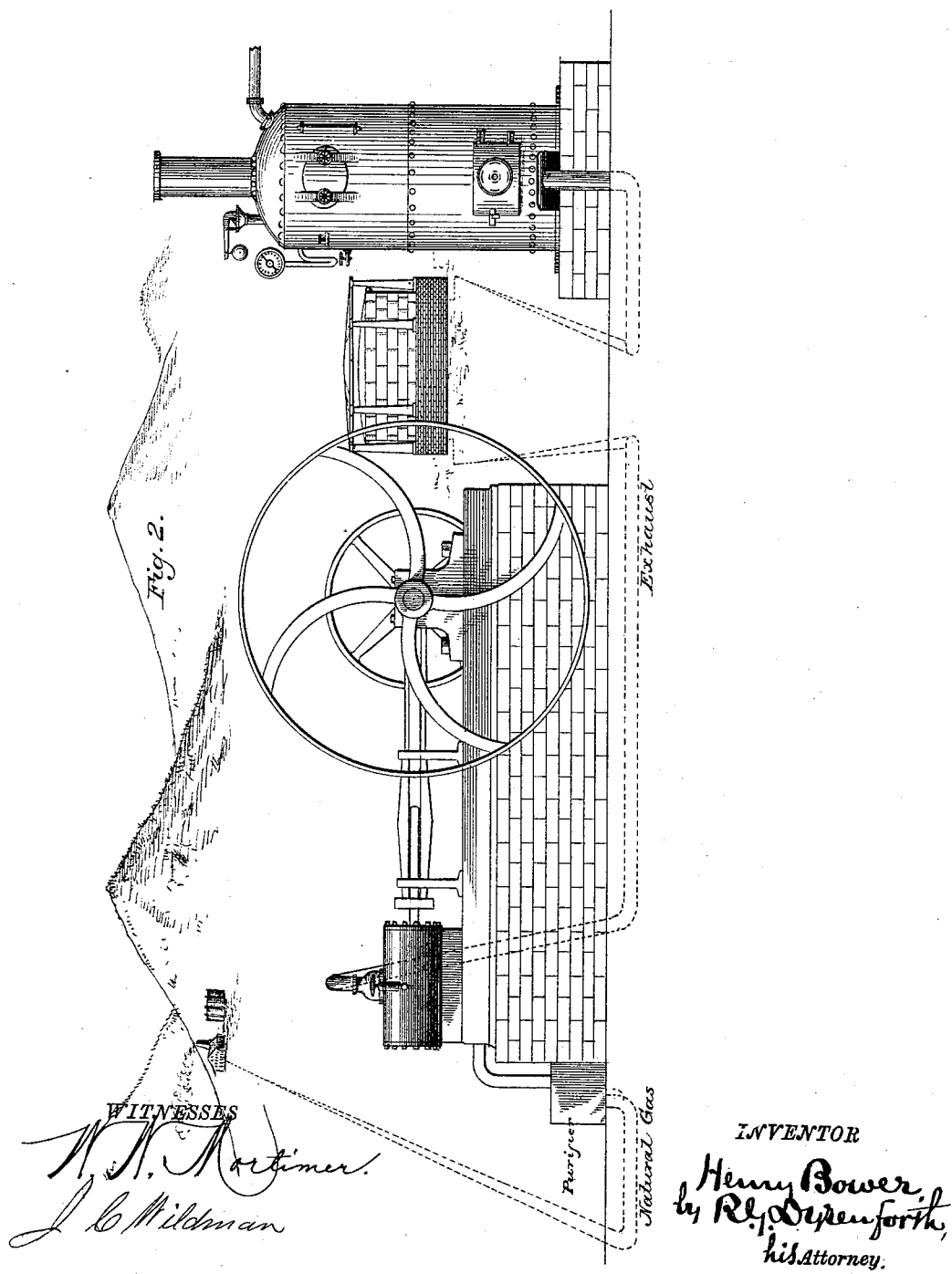

(No Model.)  5 Sheets—Sheet 3.
H. BOWER.
UTILIZATION OF NATURAL GAS.
No. 338,028.  Patented Mar. 16, 1886.
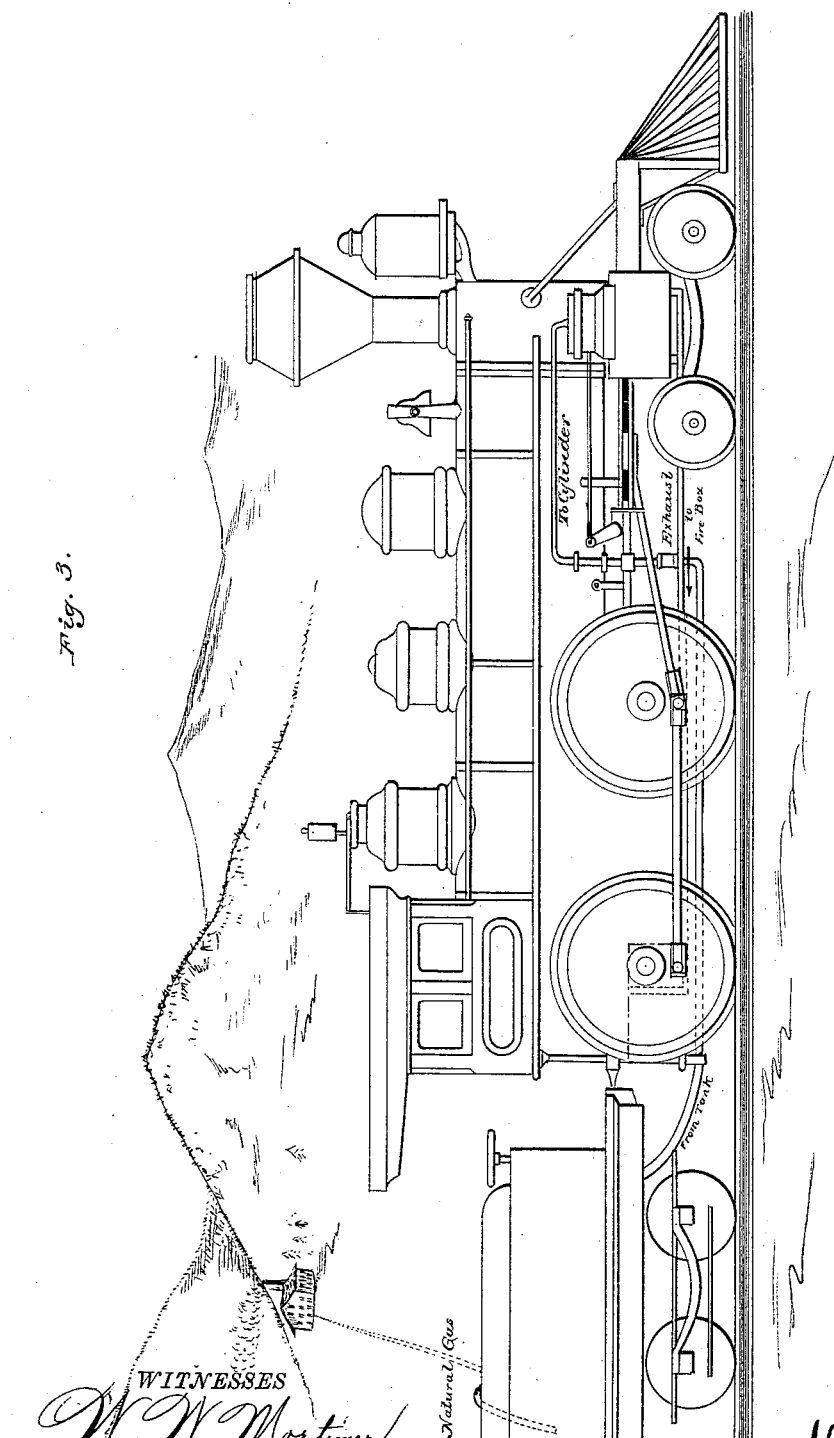
WITNESSES
W. W. Mortimer
J. C. Wildman
INVENTOR
Henry Bower,
by R. G. Dyrenforth,
his Attorney.

(No Model.) 5 Sheets—Sheet 4.
H. BOWER.
UTILIZATION OF NATURAL GAS.
No. 338,028. Patented Mar. 16, 1886.
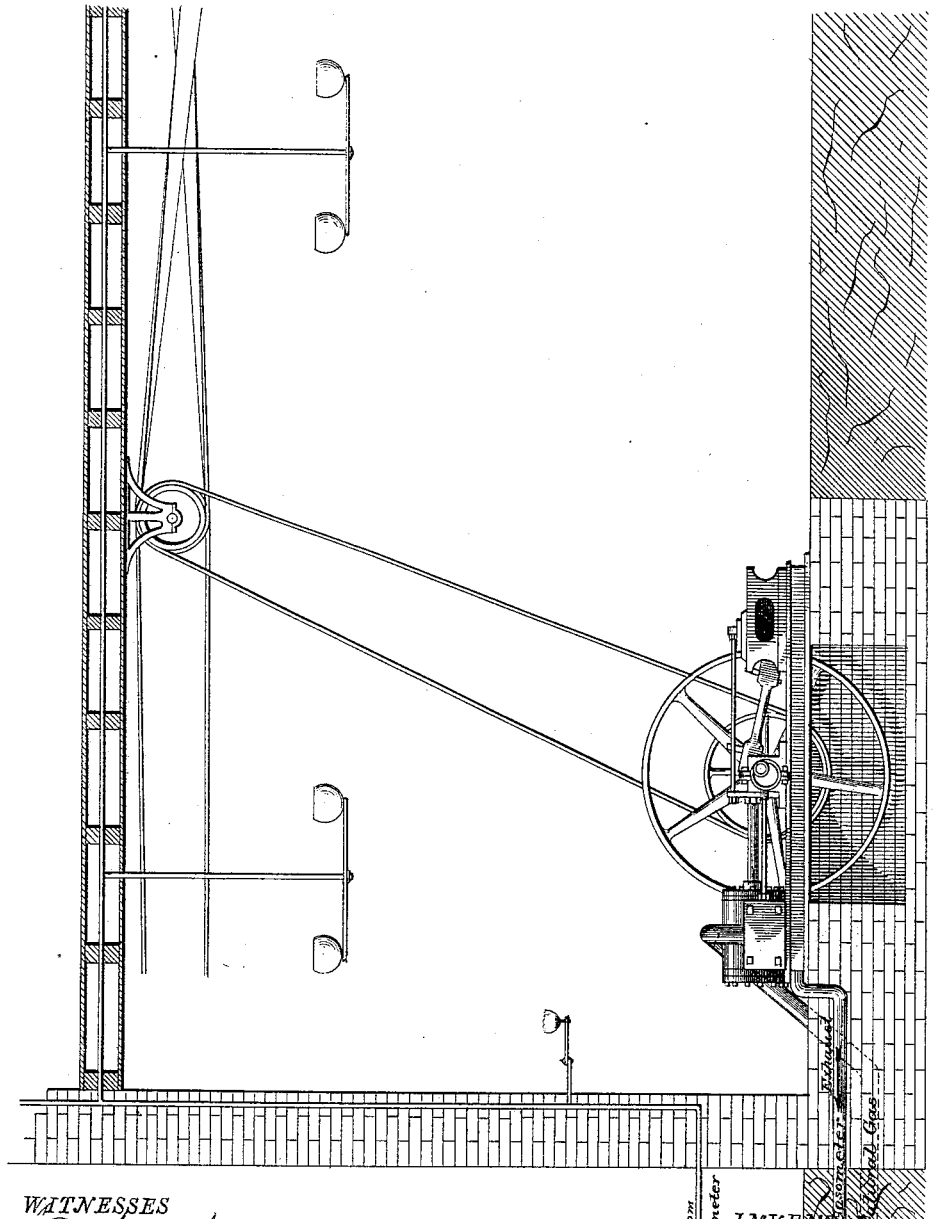

(No Model.)
H. BOWER.
UTILIZATION OF NATURAL GAS.
No. 338,028. Patented Mar. 16, 1886.
5 Sheets—Sheet 5.
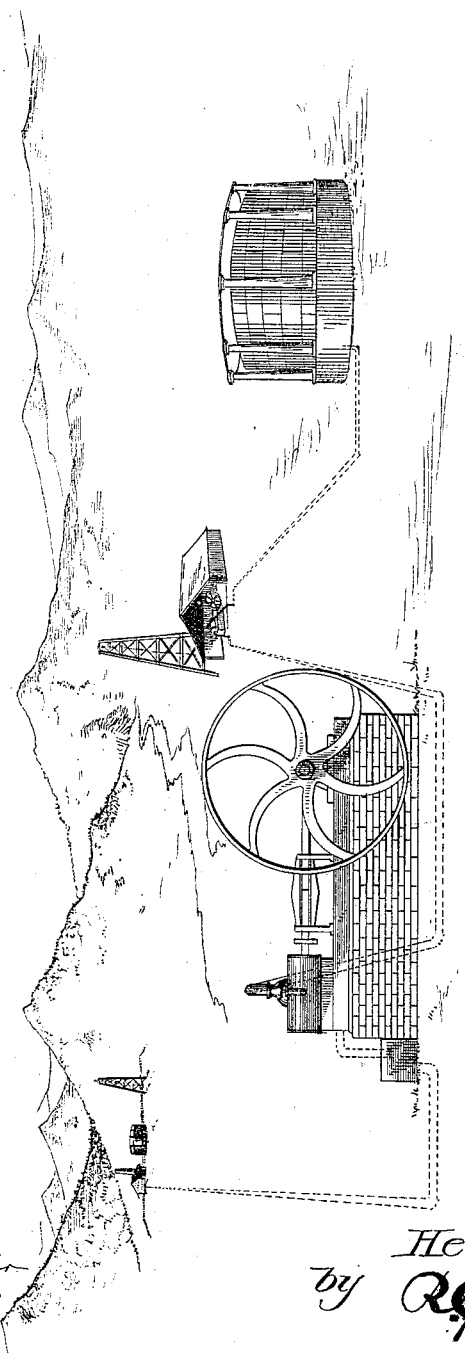

UNITED STATES PATENT OFFICE.

HENRY BOWER, OF PHILADELPHIA, PENNSYLVANIA.

UTILIZATION OF NATURAL GAS.

SPECIFICATION forming part of Letters Patent No. 338,028, dated March 16, 1886.

Application filed October 5, 1885. Serial No. 179,093. (No model.)

*To all whom it may concern:*

Be it known that I, HENRY BOWER, a citizen of the United States, residing at Philadelphia, in the county of Philadelphia and State of Pennsylvania, have invented certain new and useful Improvements in the Utilization of Natural Gas in Engines and Machinery as a Motive Power and thence in the Arts and Industries; and I do hereby declare the following to be a full, clear, and exact description of the invention, such as will enable others skilled in the art to which it appertains to make and use the same.

The invention relates to a motive power for engines and machinery.

The object is to utilize natural gas in engines and machinery in such manner that the exhaust may be employed in the arts and industries.

The invention consists in a method of utilizing the pressure and products of natural gas by first passing it to the cylinder of an engine and operating therewith, and then exhausting it into a receiver, from which it is to be taken as a lighting or heating medium, or for other use in the arts and industries.

In the accompanying drawings I have shown diagrammatically some forms of application of my invention.

Figure 1 represents its application after running an engine to a reverberatory or puddling furnace; Fig. 2, its application after running an engine to the heating of a steam-boiler; Fig. 3, its application to the running of a locomotive-engine, either entirely or on one side of the piston, the exhaust being carried to the fire-box to get up steam to be used on the other side of the piston, or alternately; Fig. 4, its application after running an engine to the lighting of a building. Fig. 5 is a diagram illustrating the employment of natural gas in successive engines, &c.

It is a well-known fact that in western Pennsylvania and elsewhere natural gas flows from the earth in great quantity and under great pressure, the pressure being as high as two hundred pounds to the square inch. This furnishes a great and ready power, which may be and has been utilized for various purposes, as for the driving of machinery in place of steam, compressed air, or other motor; but if the natural gas be used only to drive machinery, the exhaust escaping into the air is wasted. Furthermore, the escape of this gas into the air in crowded communities might be prejudicial to health, and, being highly inflammable, productive of danger. Now, I propose to utilize this exhaust by conducting the gas, after it has performed its work of driving a piston, to a situation where it may be employed for other purposes to which gas or a fluid under pressure may be applied, by conducting it either directly to its point of application or to a gasometer, where it may be stored for and its supply rendered even in subsequent use.

The employment of natural gas in the operation of engines has certain great advantages over the employment of steam. In the first place there need be no extra fireman, and the presence of an ignorant, a careless, or a lazy fireman who will either bank up his coal near the door, sloping it off toward the back, forming the "wedge method," or heap it up in the middle, with a heavy dead-center, leaving the ends and sides of the grate almost bare, allowing cold air to rush through there, forming the "turtle-back," or lay his coal in hills and hollows all over the bars, or who will constantly smother his fire with fresh coal instead of firing in the "scoop" or the "pan-cake" manner, which furthermore requires the services of a skilled and industrious man, is avoided. Furthermore, by the employment of natural gas, all danger from sparks, which so frequently cause the burning of railway-cars and disastrous conflagrations, is avoided. Furthermore, by the employment of natural gas, a great nuisance and danger incident to the evolution of steam from water—namely, foaming or priming—is avoided.

Priming is caused by the lateral frictional action of the steam against the globules of water as it is forced upward to the surface of the water, thereby putting in motion and drawing upward much water, which is borne along by the energy and velocity of the flowing steam into the pipes and cylinders. The principal occasion of priming is deficiency of steam-space in the boiler and the want of a good head of steam. This deficiency is not always traceable to faulty construction of the boiler, but may arise from mismanagement. Steam-space can either be diminished or enlarged by adjusting the level of the water within the boiler. When a boiler is filled with water, there is no steam-space, and its capability for supplying dry steam is practically diminished. In such a case the steam-space is limited to the interior of the steam-pipes and the steam-chests. If they have a cubical capacity sufficient to hold as much steam as will fill the cylinder twenty times or more, the evil of working with a boiler full of water is proportionately diminished, compared with the bad effects of small capacity in those parts. Steam-space is required to hold sufficient steam so that in the discharge from the boiler to the cylinder the pressure in the former shall not fall in any considerable degree, and that the steam-gages shall not exhibit any considerable fluctuation. Where there is only a short run of steam-pipes, the steam-space is absolutely confined to the boiler; and when that is so as much room as possible should be found for the steam above the water. The best preventive of priming is a good head of steam.

The water in the boiler has always a tendency to rise with the steam near the opening for steam to the cylinder. This tendency exists in proportion to the fluctuation of pressure at each stroke of the piston, which is caused by the steam moving from the steam-chest into the cylinder, and the steam in the water rising to the top receiving a sudden impulse to take the place of that withdrawn to work the engine. This impulsive motion signifies collision and confusion in the mixture of steam and water. Instead of there being a uniform rising of steam and a uniform falling of water to the hot plates, there is an intermittent action—explosive violence alternating with calm inaction. Steam-space prevents this if due care is taken to keep the pressure. All this danger—necessity of provision of great space, and necessity of great care in management—is obviated in the use of natural gas. Furthermore, it will be observed that the gas emerges from the earth under a certain pressure, and that this pressure is in no sense dependent upon increments of heat, being dependent upon its density alone. Now steam, when used to produce power, varies in value according to the pressure at the point of application. The greater or less elasticity of steam is not the effect of its density alone, but also of its expansion by the free heat which it contains. So, to secure the best results, the pressure has to be maintained just below the blowing-off point, and the throttle-valve least open, so that the steam may be highly elastic, for in proportion to its elasticity so is the gain in mechanical effect and economy of fuel; but when the pressure is allowed to drop, the head of steam is reduced, and instead of the valve cutting off at, say, one-third of the stroke, it must, in order to keep up the speed of the engine and machinery attached, cut off at half-stroke, and the fluctuation of pressure caused at each stroke increases the ebullition of the water near that point of the boiler whence the steam is drawn. The ascending currents of steam which are disposed to fill the steam-space are in most violent action, and they, by lateral friction, lift a large quantity of water in the form of spray. Not only so; when the induced current is sensibly felt in the boiler, particles of earthy and other foreign matter are carried up into the steam-pipes and conveyed into the cylinder, where, in conjunction with oil or grease, they cut at every stroke into the face of the valve and the cylinder. Where the water is dirty, particular care is required to keep plenty of steam waiting for the cylinder, for if the supply is short, and if it is used as soon as it is made, it will carry away with it the scum and dirt floating on the surface of the water, and the dome, pipes, steam-chest, and cylinder-ports will be plastered with mud. All this is avoided by the use of gas under pressure. Furthermore, in using the gas expansively, little or no regard need be had to alteration in temperature, since the initial pressure is not dependent upon heat. The gas, however, may be used expansively as well as steam; and it is well known that the use of an elastic fluid expansively effects a gain. It saves expenditure of elastic fluid; but it diminishes the power of the engine, while increasing the efficiency of the elastic fluid. For instance, if the fluid be cut off at half-stroke, there will be only half the quantity used; but there will be more than half the power exerted, because the elastic fluid in expanding does some work, and that is clear gain. The pressure at the end of the stroke, if the fluid be cut off at half-stroke, will be one-half the initial pressure, whatever that may be. If at one-fourth, it will be one-fourth, and so on. According to a well-known law of pneumatics, the pressure of elastic fluids varies as the space into which they are expanded or compressed. Thus, if a cubic foot of steam at ten pounds pressure be compressed into half a cubic foot, the pressure will be twenty pounds; but if expanded into two cubic feet it will be only five pounds, and even this only provided the temperature remains unaltered, since it is the raised temperature which causes the expansion—that is to say, the expansion of steam is directly dependent upon heat—whereas, as above shown, in the use of gas under pressure we are not dependent thereon, and consequently lose no force in the lowering of the temperature on expansion.

In estimating the pressure in a condensing-engine the atmospheric pressure must be included. Thus if the steam-gage shows twenty pounds and the vacuum-gage shows twenty-eight inches, (two inches equal one pound pressure,) the initial pressure 20+14=34 pounds per square inch. Now by working steam expansively it will require a larger engine to do the work, though the work can be done with a less amount of steam, whereas in using natural gas the initial pressure is already so great that a very small engine—that is to say, an engine with but small area of piston—can do as much or more work than a large engine acting with steam. Furthermore, inasmuch as the supply of the initial pressure is costless, economy in use of the elastic fluid is to be saved and utilized after having done its work in driving the engine for further purposes.

The arrangement of the valve for lap or lead may be of any suitable kind, and the piston may be cushioned on either side.

The chief difficulty to be contended with is that of back-pressure. When an engine exhausts into a vat or other receptacle, the back-pressure is enormous, unless the elastic fluid is released by a valve placed on the exhaust-pipe. Back-pressure in a condensing-engine is the total amount of pressure on the opposite side of the piston, measured from the line of perfect vacuum. The pressure in the condenser is less than the back-pressure on the piston.

Under the present invention it is proposed to have the initial pressure upon the piston exceed the back-pressure resulting from subsequent use of the exhaust, in friction or from storage-pressure, to such extent that the back-pressure will not be injuriously felt. In fact, by suitable arrangement of the valves the back-pressure may be made simply to serve as an efficient cushioning. Whenever the back-pressure would establish an equilibrium, the exhaust might be disconnected from the storage-tank. It is also proposed to use the pressure diminishingly—that is, to use the pressure, decreased after each effect, to drive an engine or perform or serve a purpose at a less pressure—and so employ a sequence or chain of engines or instrumentalities, (the term "engine" being used in the most generic sense,) each succeeding engine or instrumentality to be run by the exhaust from the preceding.

In the accompanying drawings I have shown several forms of embodiment of my invention, and in all of them it will be observed that the running of an engine by natural gas is but an element of my invention.

Thus in Fig. 1 the gas after running a stationary engine is applied to use in a reverberatory furnace. In Fig. 2, after running one stationary engine it is applied to firing up or getting up steam in another. In Fig. 3 the gas is charged into the tank of a locomotive-engine, at, say, two hundred pounds pressure, to be passed into the boiler at, say, seventy-five pounds, by means of an interposed regulator, and then to the cylinders at, say, sixty pounds, the waste to heat water in the boiler for steam, if necessary, or the gas to pass, under pressure, from storage in the tank, to the fire-box. In case of locomotive as well as in that of stationary engines, the gas may be employed against one face of the piston alone, thus economizing the gas stored, the other face of the piston to be pushed against by steam produced from water in the boiler, heated by ignition of exhaust-gas led to the fire-box from the other side of the piston. In Fig. 4 I have shown the gas led to a stationary engine, and then utilized, by admission to a gasometer or gas-holder, to light a factory or other building, where of course it may be used for heating as well. Wherever requisite, suitable regulators may be interposed to adjust to the pressure desired and to make the same constant, and it will generally be advantageous to interpose a purifier between the source of supply and the engine to which the gas is first to be applied.

It is well known that natural gas is not always a fixed gas, and that among its impurities may be found volatile hydrocarbons, which are not only injurious in the condition in which gas is employed in an engine, owing to their proneness to condense, but because they are liable to injure packing, friction-surfaces, &c., with which they may come in contact. It is to trap these hydrocarbons, as well as for more general cleaning of the gas, that the purifier is provided, and this purifier may be of any suitable kind, even embracing a wash-box.

When perfectly clean gas is used, all clogging is avoided, and in general by the employment of the gas the injury incident to priming or foaming, so frequent in the use of steam, and all accidents incident to the formation of scale in the boiler, are obviated.

I have particularly shown and described only a few of the forms of embodiment of my invention, since it is obvious that the same consists, broadly, in the utilization of gas which, under pressure, has been employed to drive an engine of any suitable kind.

My invention practically revolutionizes the present system. Instead of having to begin with heat, an engine is first run cold, and then what has produced this effect is employed for heat. In other words, instead of having to employ first heat and then pressure, I employ first pressure and then heat.

Having thus described my invention, what I claim, and desire to secure by Letters Patent, is—

1. The method of utilizing the pressure and products of natural gas, consisting, first, in passing the gas under its initial pressure to an engine, next in conducting the exhaust by its own pressure to a chamber, furnace, stove, or other place, where it is ignited or otherwise used, substantially as set forth.

2. The method of utilizing the pressure and products of natural gas under its initial pressure, consisting, first, in passing the gas through a purifier, next to the cylinder of an engine, and next in exhausting it to a receiver, conducting it into a chamber, furnace, or other place, where it is ignited or otherwise used, or allowing it to escape, substantially as set forth.

3. The method of utilizing the pressure and products of natural gas, consisting, first, in passing the gas to a regulator, next to the cylinder of an engine, next in exhausting it to a receiver or point of application, and then in conducting it into a chamber, furnace, stove, or other place, where it is ignited or otherwise used, substantially as described.

4. The method of utilizing the pressure and products of natural gas, consisting, first, in passing the gas through a purifier, next through a regulator, next to the cylinder of an engine, then exhausting it to a receiver or point of application, and then conducting it into a chamber, furnace, stove, or other place, where it is ignited or otherwise used, substantially as set forth.

5. The method of utilizing the pressure and products of natural gas, consisting, first, in passing the gas under its initial pressure to an engine, next passing the exhaust by its own pressure to succeeding engines, and finally conducting it by its own pressure into a chamber, furnace, stove, or other place where it is ignited or otherwise used.

In testimony whereof I affix my signature in presence of two witnesses.

HENRY BOWER.

Witnesses:
CHAS. J. SNYDER,
H. B. ASHMEAD.